Nov. 11, 1947.  A. B. POOLE  2,430,782
ELECTROMAGNETIC CURRENT-INTERRUPTION INDICATING-MEANS
FOR ELECTRIC TIME INSTRUMENTS
Filed Feb. 18, 1947
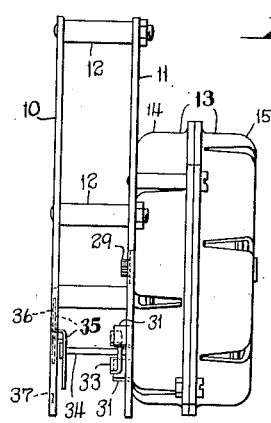
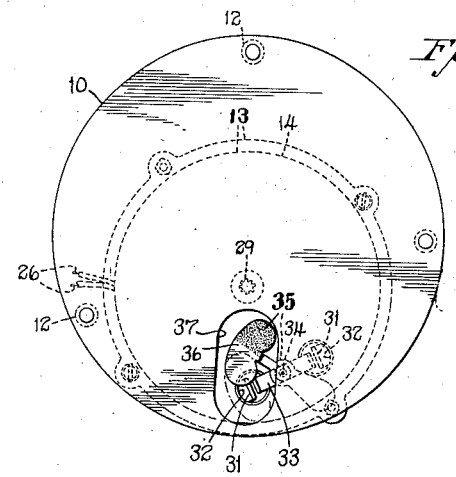
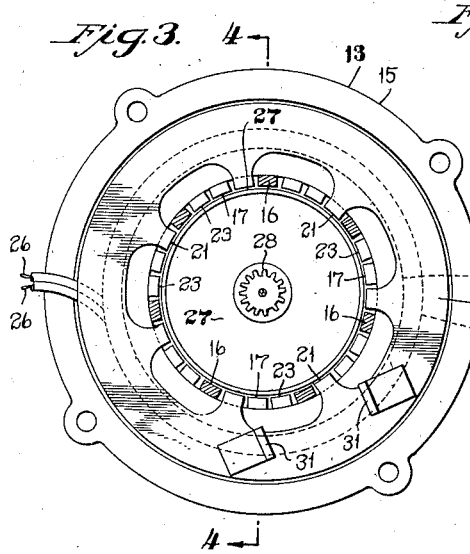
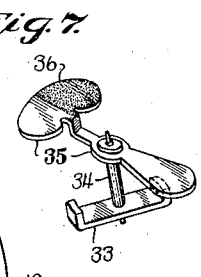
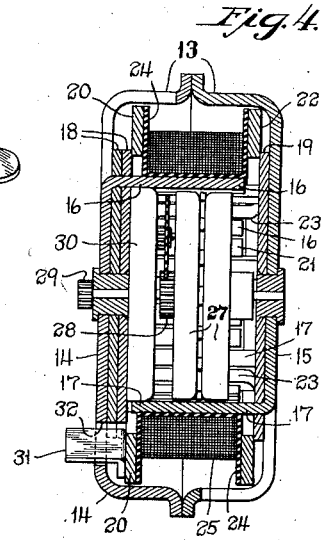
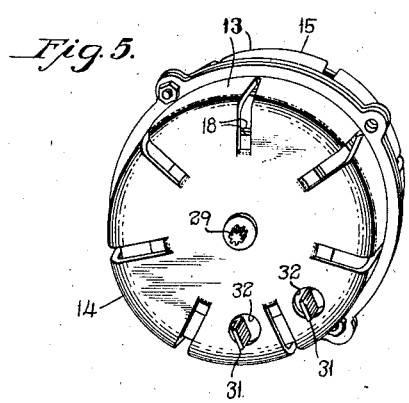
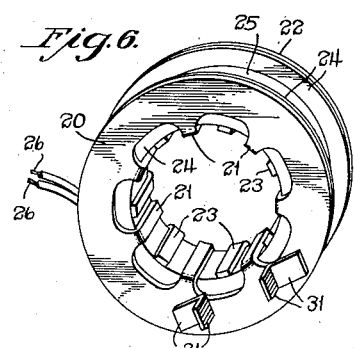
Inventor
Arthur B. Poole
By Seymour, Earle & Nichols
Attorneys Patented Nov. 11, 1947

2,430,782

UNITED STATES PATENT OFFICE 2,430,782

ELECTROMAGNETIC CURRENT-INTERRUPTION INDICATING MEANS FOR ELECTRIC TIME INSTRUMENTS

Arthur B. Poole, Harwinton, Conn.

Application February 18, 1947, Serial No. 729,386

4 Claims. (Cl. 177—311)

The present invention relates to improvements in electromagnetic current-interruption indicating-means for electric clocks and other electric time instruments, i. e., means whereby an observer is warned that a current interruption has occurred which would affect the accuracy of the time indications of the clock or other time instrument.

Numerous electromagnetic current-interruption indicating-means of the general character above referred to have been heretofore designed but all thereof have been open to objections among which may be mentioned any one or all of complexity, high cost and noisiness.

One of the main objects of the present invention is to provide a simple, reliable and effective electromagnetic current-interruption indicating-means which may be provided at low cost for manufacture and which will not occasion objectionable vibration or noise under the influence of magnetism from an alternating-current source.

Another object of the present invention is to provide a superior current-interruption indicating-means of the character above referred to which is controlled directly by the magnetism of the stator-structure of a synchronous electric motor which also serves to provide the time indications.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purpose:

Fig. 1 is an edge view of a pair of movement-plates adapted to accommodate a time-train and in connection with which is shown a synchronous electric motor and electro-magnetic current-interruption indicating-means of the present invention;

Fig. 2 is a view thereof in front elevation;

Fig. 3 is a view in front elevation of the synchronous electric motor with the front stator-shell member, front shading-plates and gear-case removed and with the polar-projections of the said front stator-shell member indicated in section;

Fig. 4 is a central sectional view of the complete synchronous electric motor corresponding to a location indicated by the line 4—4 of Fig. 3;

Fig. 5 is a perspective view of the synchronous electric motor viewing the same mainly from the front;

Fig. 6 is a similar view of the unit comprising the spool, energizing-coil and the two stator-plates; and Fig. 7 is a perspective view of the unit comprising the swinging signal-armature, indicator-shaft and signal-member.

The particular structure illustrated in the accompanying drawings for purposes of making clear a preferred form of the present invention includes a front movement-plate 10 and a complemental rear movement-plate 11 laterally spaced from each other by a plurality of pillars 12 to provide a space for the accommodation of any suitable time-train (not shown), in a manner common in the art of synchronous electric clocks.

Secured to the rear face of the rear movement-plate 11 above referred to is a self-starting synchronous electric motor generally designated by the reference character 13 and which will be presently described in detail.

A synchronous electric motor 13 includes a front cup-shaped stator-shell member 14 and a complemental rear cup-shaped stator-shell member 15 having their respective open faces toward each other and cooperating to provide a complete stator-shell enveloping a plurality of elements as will hereinafter appear.

The front stator-shell member 14 is pierced and has the material from the said piercings struck rearwardly to provide a series of circumferentially-spaced-apart pole-salients 16 extending in parallelism with the axis of the said member 14 and "interspersed," so to speak, with similar pole-salients 17 projecting forwardly from the rear stator-shell member 15.

Seated against the inner or rear face of the front stator-shell member 14 is a pair of front shading-plates 18—18 suitably pierced for the passage therethrough of the pole-salients 16. The said shading-plates are made of any suitable non-magnetic but high electro-conductive material such, for instance, as copper and serve to shade or cause a lag in the magnetic flux in the pole-salients 16 with respect to other pole-salients to be hereinafter described.

Mounted against the inner or front face of the rear stator-shell member 15 is a shading-plate 19 through which the pole-salients 17 forwardly extend and which, like the shading-plates 18—18, discharges a shading or lagging function with respect to the said pole-salients 17.

Seated against the rear face of the shading-plates 18—18 is a ring-like front stator-plate 20 having portions of its inner edge bent rearwardly to provide a plurality of pole-salients 21. Seated against the forward face of the rear shading-plate 19 is a ring-like rear stator-plate 22 having portions of its inner edge bent forwardly by a plurality of pole-salients 23.

Encircling the various pole-salients 16, 17, 21 and 23 which form an annular series, is a spool 24 located axially intermediate the front and rear stator-plates 20 and 22. Wound in the spool 24 is an energizing-coil 25 having the usual two terminal-leads 26—26 which are adapted to be connected to a source of alternating current such, for instance, as 110-volt 60-cycle alternating current.

The pole-salients 21 and 23 respectively projecting from the front stator-plate 20 and the rear stator-plate 22 receive unretarded or unshaded magnetic flux generated by the energizing-coil 25 and apply such flux to a rotor-unit generally designated by the reference character 27. The said rotor-unit is formed of magnetic material and rotates within the confines of the cylindrical form outlined by the various pole-salients 16, 17, 21 and 23 and requires no detailed description herein other than to note that the said rotor-unit rotates in synchronism with the current supplied to the energizing-coil 25, in a manner common in the art.

Unlike the pole-salients 21 and 23, the pole-salients 16 and 17 do not receive unretarded magnetic flux but the magnetic flux flowing therein from the respective stator-shell members 14 and 15 is shaded or caused to lag by the shading-plates 18—18 and 19. The shaded pole-salients 16 and 17 act in conjunction with the unshaded pole-salients 21 and 23 to provide self-starting torque (rotating field effect) to turn the rotor-unit 27, in a manner well understood in the art.

Preferably and as shown, the respective peripheries of the front and rear stator-plates 20 and 22 are spaced slightly inwardly from the adjacent walls of the front and rear stator-shell members 14 and 15, as is shown in Fig. 4.

In the particular instance illustrated, the rotor-unit 27 is provided at its forward end with a drive-pinion 28 which in any suitable manner serves to turn at a relatively-reduced speed a pinion 29 located at the front of the front stator-shell member 14 and projecting through the rear movement-plate, in the manner illustrated in Fig. 1.

The driving-connection between the drive-pinion 28 and the pinion 29 may be mainly enclosed within a gear-case 30 suitably secured against the rear face of the pair of shading-plates 18—18, as is indicated in Fig. 4. The particular nature of the drive between the drive-pinion 28 or its equivalent and the pinion 29 is not per se involved in the present invention and therefore requires no detailed description herein.

Projecting forwardly from the front stator-plate 20 is a pair of leakage-salients 31—31 which may be spot-welded or otherwise secured to the said stator-plate or formed integral therewith, if desired. The said leakage-salients respectively project forwardly through clearance-openings 32—32 formed in the front wall of the cup-shaped front stator-shell member 14, as is especially well shown in Fig. 5, the said leakage-salients 31—31 also extend forwardly through the rear movement-plate 11 into the space intermediate the said movement-plate and the front movement-plate 10, as is indicated in Fig. 1.

The movement-plates 10 and 11 above referred to are preferably formed of brass or other non-magnetic material, while the parts 14, 15, 20, 22 and 31—31 are preferably formed of soft iron, silicon steel, or other magnetic material having low-hysteresis values.

Mounted for turning movement between the projecting forward portions of the respective leakage-salients 31—31 is a swinging signal-armature 33 of U-shaped form and rigidly mounted upon the rear portion of an indicator-shaft 34. The said shaft is journaled at its front and rear ends respectively in the front movement-plate 10 and the rear movement-plate 11. Rigidly attached to the forward portion of the indicator-shaft 34 is a signal-member generally designated by the reference character 35 and having a relatively-heavy signal-head 36 visible through a relatively-large sight-opening 37 in the front movement-plate 10. The unit comprising the parts 33, 34, 35 and 36 is so proportioned that gravity will serve to cause the signal-head 36 to swing downwardly unless the said unit is magnetically restrained, in a manner as will hereinafter appear. Preferably, the signal-armature 33 is formed of soft iron or silicon steel, while the signal-member 35 is preferably formed of aluminum, brass, or other nonmagnetic material.

*Operation*

Assuming that the terminal-leads 26—26 of the energizing-coil 25 are connected to a suitable source of alternating current, the rotor-unit 27 will be synchronously rotated to, in turn, rotate the pinion 29 and such time-indicating means as may be connected thereto.

Under the conditions just above referred to, magnetic flux will appear in both of the leakage-salients 31—31 and will have the effect of holding the signal-armature 33 in alignment therewith in the manner indicated in Fig. 2, to thus hold the signal-head 36 of the signal-member 35 in an elevated position.

Should, however, the current supply to the energizing-coil 25 be interrupted for any reason, the rotor-unit 27 will, of course, stop rotating and the signal-head 36 will drop from the position in which it is shown by full lines in Fig. 2 into the position in which it is indicated by broken lnes in the same figure to thereby indicate to an observer there has been a current interruption.

If desired, the respective upper and lower portions of the front face of the signal-head 36 may be differentially colored as, for instance, with the upper half colored red and the lower half in white.

Now, when the current supply to the energizing-coil 25 is resumed, it is preferred that the strength of the magnetic flux in the leakage-salients 31—31 be such as not to pull the signal-armature 33 and the signal-member 35 back into the position in which it is shown in Fig. 2, since otherwise the user of the clock or other time instrument would not know of a current interruption unless the user had been observing the position of the signal-member during the period of such interruption.

To effect the resetting of the signal-member 35 into its normal position, as shown in Fig. 2, the entire mechanism may be tilted about the axis of the rotor-unit 27 to again bring the signal-armature 33 into substantial alignment with the leakage-salients 31—31, following which the said signal-armature and, hence, the signal-member 35 will be magnetically retained in the position in which they are shown in Fig. 2.

Inasmuch as both of the leakage-salients

31—31 are on the same side of the energizing-coil 27, they will both be magnetized with like instantaneous polarities, despite which the signal-armature 33 or its equivalent will be magnetically held in the position indicated in Fig. 2. It appears that magnetic flux from the front stator-shell member strays into the armature 33 which serves as a shunt therefor. Magnetic flux will also leak between the leakage-salients 31—31 and the material surrounding the clearance-openings 32—32.

It has been found that by means of the construction and arrangement above described and illustrated in the accompanying drawings, the armature 33 is singularly free of alternating-current hum.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. Indicating-means of the character described, including in combination: a synchronous electric motor having an energizing-coil, a stator-shell magnetically coupled to the said energizing-coil and provided with a set of pole-salients and with clearance-means for the passage of the hereinafter-mentioned leakage-salients, an inner stator-member within the said stator-shell and also magnetically coupled to the said energizing-coil, the said inner stator-member also having a set of pole-salients cooperating with the set of pole-salients of the said stator-shell, the said inner stator-member having a pair of spaced-apart leakage-salients projecting outwardly therefrom through the said clearance-means in the said stator-shell and to the exterior of the latter, and shading-means for causing a time-lag between the respective magnetic fluxes of the said sets of pole-salients; a signal-controlling armature located exteriorly of but adjacent the said stator-shell and magnetically cooperating with the pair of leakage-salients projecting from the said inner stator-member; and signal-means connected to and movable by the said signal-armature.

2. Indicating-means of the character described, including in combination: a synchronous electric motor having an energizing-coil, a stator-shell magnetically coupled to the said energizing-coil and provided with a set of pole-salients and with clearance-means for the passage of the hereinafter-mentioned leakage-salients, an inner stator-member within the said stator-shell and also magnetically coupled to the said energizing-coil, the said inner stator-member also having a set of pole-salients cooperating with the set of pole-salients of the said stator-shell, the said inner stator-member having a pair of spaced-apart leakage-salients projecting outwardly therefrom through the said clearance-means in the said stator-shell and to the exterior of the latter, and shading-means encircling the set of pole-salients of the said stator-shell to cause a time-lag between the magnetic flux therein and the magnetic flux in the set of pole-salients of the said inner stator-member; a signal-controlling armature located exteriorly of but adjacent the said stator-shell and magnetically cooperating with the pair of leakage-salients projecting from the said inner stator-member; and signal-means connected to and movable by the said signal-armature.

3. Indicating-means of the character described, including in combination: a synchronous electric motor having an energizing-coil, a stator-shell magnetically coupled to the said energizing-coil and provided with a set of pole-salients and with two spaced-apart clearance-openings for the passage of the hereinafter-mentioned two leakage-salients, an inner stator-member within the said stator-shell and also magnetically coupled to the said energizing-coil, the said inner stator-member also having a set of pole-salients cooperating with the set of pole-salients of the said stator-shell, the said inner stator-member having a pair of spaced-apart leakage-salients projecting outwardly therefrom respectively through the clearance-openings in the said stator-shell and to the exterior of the latter, and shading-means for causing a time-lag between the respective magnetic fluxes of the said sets of pole-salients; a signal-controlling armature located exteriorly of but adjacent the said stator-shell and magnetically cooperating with the pair of leakage-salients projecting from the said inner stator-member; and signal-means connected to and movable by the said signal-armature.

4. Indicating-means of the character described, including in combination: a synchronous electric motor having an energizing-coil, a stator-shell magnetically coupled to the said energizing-coil and provided with a set of pole-salients and with a pair of spaced-apart clearance-openings respectively for the passage of one of the hereinafter-mentioned pair of leakage-salients, an inner stator-member within the said stator-shell and also magnetically coupled to the said energizing-coil, the said inner stator-member also having a set of pole-salients cooperating with the set of pole-salients of the said stator-shell, the said inner stator-member having a pair of spaced-apart leakage-salients projecting outwardly therefrom respectively through the clearance-openings in the said stator-shell and to the exterior of the latter, and shading-means encircling the set of pole-salients of the said stator-shell to cause a time-lag between the magnetic flux therein and the magnetic flux in the set of pole-salients of the said inner stator-member; a signal-controlling armature located exteriorly of but adjacent the said stator-shell and magnetically cooperating with the pair of leakage-salients projecting from the said inner stator-member; and signal-means connected to and movable by the said signal-armature.

ARTHUR B. POOLE.